United States Patent [19]

Santorio

[11] Patent Number: 5,077,998

[45] Date of Patent: Jan. 7, 1992

[54] MACHINE TOOL

[75] Inventor: Franco Santorio, Turin, Italy

[73] Assignee: Amada Company, Limited, Japan

[21] Appl. No.: 388,478

[22] Filed: Aug. 2, 1989

[30] Foreign Application Priority Data

Aug. 3, 1988 [IT] Italy .................. 67735 A/88
Aug. 3, 1988 [IT] Italy .................. 67736 A/88

[51] Int. Cl.⁵ .................................. B21J 13/04
[52] U.S. Cl. ............................ 72/21; 72/389; 72/456; 100/231
[58] Field of Search ............ 72/407, 455, 456, 389; 83/859; 100/231; 72/21

[56] References Cited

U.S. PATENT DOCUMENTS

| 1,458,667 | 6/1923 | Sustarich | 72/456 |
| 2,051,447 | 8/1936 | Johansen | 100/231 |
| 2,296,051 | 9/1942 | Pocock | 100/231 |
| 2,875,808 | 3/1959 | Nelson | 72/456 |
| 3,688,772 | 6/1972 | Fink | 29/33 P |
| 3,991,602 | 11/1976 | Harcuba | 72/456 |
| 4,321,819 | 3/1982 | Kraft | 72/389 |
| 4,403,498 | 9/1983 | Holtschmidt | 72/389 |
| 4,510,789 | 4/1985 | Tomioka | 72/472 |
| 4,590,784 | 5/1986 | Okabe et al. | 72/389 |

FOREIGN PATENT DOCUMENTS

| 964018 | 7/1950 | France | 72/389 |
| 1110487 | 2/1956 | France | 72/389 |
| 1222573 | 4/1986 | U.S.S.R. | 100/231 |
| 941246 | 9/1961 | United Kingdom . |
| 1318183 | 4/1969 | United Kingdom . |
| 1482729 | 7/1975 | United Kingdom . |
| 2182595 | 9/1985 | United Kingdom . |

Primary Examiner—Daniel C. Crane
Attorney, Agent, or Firm—Wigman & Cohen

[57] ABSTRACT

A force isolating machine tool. The invention is directed to a machine tool divided into two separate co-operating structures, a first frame structure for supporting and guiding a pair of tools to provide precision of movement and a second frame structure for transmitting reaction forces. The first and second frame structures are pivotally connected along the axis along which the tools move.

13 Claims, 5 Drawing Sheets

MACHINE TOOL

BACKGROUND OF THE INVENTION

1. Field of the Invention

The present invention relates to machine tools such as bending presses and punching machines for sheet metal.

2. Description of the Prior Art

Conventional bending presses intended to bend a sheet metal have a very simple structure in which two or more C-shaped pillars carry a pair of facing plates, the upper or lower one of which is movable vertically towards the other plate. The horizontal facing edges of the plate carry the bending tools constituted by a linear punch and die. In the most common arrangement, the die is carried by the lower plate and the punch is carried by the upper plate.

The movement of the movable plate is achieved by electrical or hydraulic means which move it exactly parallel to the vertical working plane defined by the die and the punch.

In conventional bending presses, the C-shaped pillars constitute a force structure which transmits the mutual force between the punch and the die. In large presses this force may reach many hundreds of tons.

The force structure, however, also has the function of guiding the mutual movement of the die and the punch precisely not only in the vertical working plane but also in vertical planes perpendicular to the working plane in order to prevent as far as possible undesirable deviations of the bending line from the correct position.

Accordingly, in the bending press having the structure mentioned above, during the bending operation, the force structure undergoes elastic deformation, and the precision of the bending operations deteriorates.

Punches are machines which are able to form holes of any size in a metal sheet, as well as trimming it and cutting the outline by means of blanking operations.

The conventional punches include a massive structure, usually in the form of a C but sometimes, for reasons of rigidity, taking the form of a closed ring. At least one die and a corresponding punch are fixed so as to be perfectly coaxial to the lower part and the upper part of the C-shaped structure respectively. In practice, a punch has a multiplicity of dies and punches which are rapidly interchangeable in various ways, for example, by means of rotary turrets.

In the case of a punch with the C-shaped structure, the structure also has a force function and transmits the mutual force between the punch and the die, which in very large punches may reach even tens or sometimes hundreds of tons. A punch differs from a bending machine in that the blanking is carried out at a high speed and the force is typically impulsive.

In addition to the force function, the C-shaped structure or ring structure of the punch must also fulfil a precision function, that is, of maintaining the die and the punch in perfect alignment. Moreover, it must support the numerically-controlled drive members for the metal to ensure the necessary repeatability and precision of the movements.

These precision functions are extremely onerous because of the vibrations caused by the impulsive punching forces.

Further, a horizontal ball table of known type is associated with conventional punching machines for supporting and sliding the metal sheet to be worked. This table is situated in front of the opening of the punching space and is extended by another coplanar ball table within the space itself.

The metal sheet which rests on the ball table is gripped along an edge remote from the punching space by grips or clamps driven by a numerically-controlled movement system along two horizontal axes which are perpendicular to each other.

By virtue of this system, the metal sheet can be moved very rapidly in the working area for the execution of various punching operations at any point on the metal sheet, whilst it rests on the ball table.

In conventional punching machines, the ball table is used to reduce as much as possible the sliding friction of the metal sheet which is moved horizontally by the clamps driven by the numerically-controlled system. However, even ball tables have friction which is not negligible, particularly in the case of large metal sheets; as an indication, it is sufficient to realize that the punching machines which are currently available on the market are able to deal with metal sheets of $2500 \times 2500 \times 6$ mm, which may weigh 175 kg if they are of steel.

Yet another disadvantage of ball tables, which is as serious as friction for the purposes of precision, is that, during punching, the balls constitute localized point supports which may even correspond to regions already punched. The losing and regaining of the contact between the ball and the metal sheet in the punched region causes an uncontrolled disturbance in the accuracy of the positioning of the metal sheet on the table.

SUMMARY OF THE INVENTION

In view of the foregoing, it is therefore the first object of the present invention to provide a machine tool such as a bending press or a punching machine in which the precision of the bending and punching operations respectively is not influenced by the elastic deformation which the force structure necessarily undergoes during working.

In order to achieve the above-mentioned first object, the machine tool of this invention includes, a pair of tools which are movable toward and away from each other to process a workpiece; tool support-and-guide means for supporting the pair of tools and guiding at least either one of the tools along a specified axis; reaction force transmitting means which causes the pair of tools to move toward and away from each other and transmits the reaction force which is acted on the tool during processing operation, from one tool to the other; means for connecting the reaction force transmitting means to the tool support-and-guide means.

This invention has been developed for application to bending presses and punching machines but its scope is not limited to these types of machine. Thus, for example, the same problems could arise in an upright drilling machine in which a drill bit, constituting the tool, is movable vertically towards and away from a piece-holding table constituting the counter tool.

The invention is based on the finding that, in conventional machines, the two functions of force and precision are fulfilled by the same structure although they have contrasting requirements. In fact, the transmission of force, for example, for bending or punching, necessarily involves a deformation of the structure which is more or less elastic, while the precision function would require the structure not to be subject to any deformation.

In the prior art, there is a tendency to solve the problem by dimensioning the structure so as to give the maximum rigidity compartible with economy and bulk. This criterion thus obviously constitutes a compromise since it results in a structure of excessive size solely for the purpose of transmitting force, which the achievement of the necessary precision is uncertain since, whatever the over-dimensioning of the structure, it is in any case subject to deformation and vibration.

The current tendency in the field of machines is to achieve ever-greater precision and at the same time ever-increased productivity, that is, in the case of a bending press or a punching machine, an ever-increasing number of strokes (bends or punches) per minute. Clearly, the compromise constructional criteria adopted in the prior art are reaching their limits and the latter may be achieved only by means of a radical conceptual modification.

The solution of the invention is indeed a radical conceptional modification in that the overall structure of the machine is split into two separate structures, of transmitting a working force and a precision structure which has the sole task of rigorously maintaining the relative position between the workpiece and the tool or tools (for example, a die and a punch) as well as between the tools themselves.

Now, it is the second object of the present invention to provide a punching machine in which the metal sheet is subject to zero or negligible friction and, in particular, is not subject to uncontrolled disturbances, due to the losing and regaining of the contact between the ball and the metal sheet in the punch region, during its movement by the numerically-controlled system.

To achieve the second object of the present invention, the punch press of the present invention includes, a pair of tools which are movable toward and away from each other along a horizontal axis to process a workpiece; frame means for supporting the pair of tools; and workpiece moving and positioning means supported on the frame means so as to be movable in the plane perpendicular to the tool moving axis for moving and positioning the workpiece to be processed, while suspending the workpiece.

In a punching machine according to the invention, the ball table is completely eliminated, since the metal sheet is suspended.

In a preferred embodiment, the metal sheet is suspended vertically and a support table is completely unnecessary.

In another preferred embodiment, the metal sheet is suspended whilst it rests in a subvertical position on a surface which, given the negligible value of the component of the weight of the metal sheet bearing thereon, is perfectly smooth. In practice, this subvertical support surface has the sole function of defining a guide plane for preventing the metal sheet from pivoting in the direction perpendicular to its plane, entirely to the advantage of the precision.

BRIEF DESCRIPTION OF THE DRAWINGS

These feature and advantage of the machine tool according to the present invention will be more clearly appreciated from the following description taken in conjunction with the accompanying drawings in which like reference numerals designate the same or similar elements or sections throughout the figure thereof in which.

DETAILED DESCRIPTION OF THE PREFERRED EMBODIMENTS

Figure 1:
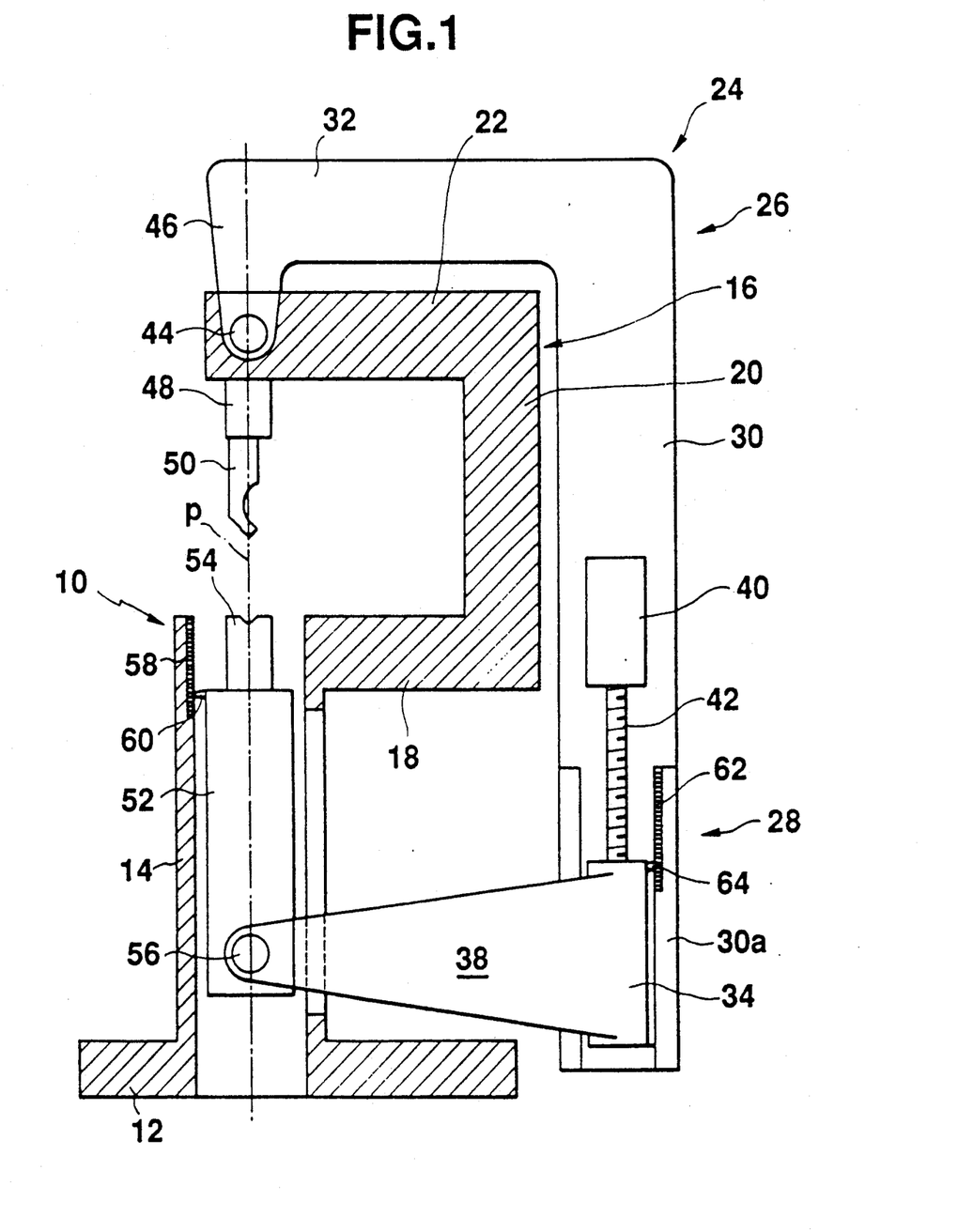
FIG. 1 is a partially-sectioned, schematic side elevational view of a bending press according to the first feature of the invention.

With reference to FIG. 1, the press includes a framework, generally indicated as a tool support-and-guide means 10. The tool support-and-guide means 10 may be constituted by two or more elements located side by side like the C-shaped pillars of a conventional bending press.

The tool support-and-guide means 10 is monolithic in the sense that its various parts are rigidly connected together. The tool support-and-guide means 10 includes a base-plate 12 for fixing to the floor, from which rises a base part 14 constituting a leg section thereof.

The base part 14 is followed by a C-shaped upper part indicated 16, which in its turn includes a first lower arm 18, a pillar 20 and a first upper arm 22 which projects so as to overlie the base part 14.

The press further includes a reaction force transmitting means, generally indicated 24. This reaction force transmitting means 24 may also consist of several parts disposed like the C-shaped pillars of a conventional press, each located in correspondence with a tool support-and-guide means 10.

The reaction force transmitting means 24 is formed by two robust sections, an upper one 26 and a lower one 28. The upper section 26 comprises a strong column 30 from the top of which projects an second upper arm 32. The lower section 28 includes a slide 34 which is slidable with a prismatic coupling in a lower part 30a of the column 30. The slide 34 carries a second lower arm 38 which extends into the base part 14 of the tool support-and-guide 10. As may be seen, the arrangement of the reaction force transmitting means 24 is such that its upper and lower arms 32, 38 embrace the upper C-shaped part 16 of the tool support-and-guide means structure.

Within the column 30 is a working-force generator member constituted by a numerically-controlled motor 40 with a threaded vertical shaft 42. The shaft 42 is engaged with an internal thread, not shown, of the slide 34. Obviously, this type of drive is not limitative and may be replaced, for example, by a hydraulic motor.

The reaction force transmitting means 24 is connected to the tool support-and-guide means 10 in a floating manner by virtue of a suspension zone formed by a first connecting pin 44 and by virtue of the base part 14 which, as will be seen below, constitutes a guide. Specifically, the pin 44 interconnects the free end of the first upper arm 22 and a fork 46 which forms part of the free end of the second upper arm 32 of the reaction force transmitting means 24, so that the second upper arm 32 is pivotable about the first connection pin 44 against the first upper arm 22.

Beneath the free end of the first upper arm 22 is fixed a tool holder 48 which, given the closeness of the pin 44, may be considered as fixed to the first connection pin 44 itself and to the fork 46. The tool holder 48 carries a bending punch 50 of a conventional type.

A vertical slide 52 is slidable vertically within the base part 14 of the tool support-and-guide means 10 by means of a prismatic coupling. The vertical slide 52 acts a tool holder for a bending die 54 of conventional type. The vertical slide 52 is carried by the free end of the second lower arm 38 of the reaction force transmitting means 24 by means of a second connecting pin 56, so that the second lower arm 38 is pivotable about the second connection pin 56 against the vertical slide 52.

As will be understood, in the arrangement shown, the bending of a metal sheet occurs with an ascending stroke of the second lower arm 38, the vertical slide 52 and the die 54 driven by the motor 40, while the punch 50 remains fixed. The path of the vertical slide 52 and of the die 54 is vertical and straight and is indicated by the axis P which also indicates the trace of the vertical working plane of the punch 50 and the die 54. This plane P coincides rigorously with the corners of the cooperating dihedra of the punch 50 and the die 54.

Moreover, the axes of the two connecting pins 44 and 56 are horizontal and lie rigorously in the plane P.

As will be understood, in the arrangement illustrated in FIG. 1, the tool support-and-guide means 10 and the reaction force transmitting means 24 are connected bi-univocally together, that is to say, each position of the one corresponds to just one position of the other and vice versa.

Clearly, however, any deformation of the reaction force transmitting means 24 caused when the force necessary for bending the metal sheet correctly is generated between the die 54 and the punch 50, does not alter the tool support-and-guide means 10 in the least. This is because the compression force between the aligned elements, such as the first connecting pin 44, the punch holder 48, the punch 50, the vertical slide 52, the die 54 and the second connecting pin 56, is bourne by the reaction force transmitting means 24.

Specifically, when the compression force is bourne by the reaction force transmitting means 24 and the reaction force transmitting means 24 is deformed, the second upper arm 32 will pivot about the first connecting pin 44 against the first upper arm 22 and/or the second lower arm 38 will pivot about the second connecting pin 56 against the vertical slide 52.

Accordingly the tool support-and-guide means is not subjected to the deformation due to the compression force acting on the elements such as the punch 50 and the die 54.

In other words, the compression forces which vary during bending are, on the other hand, absorbed by the single reaction force transmitting means 24 which may bend correspondingly, without this bending altering the position of the working path or plane P; all of these features improve the precision of bending. Only forces which do not vary during the bending of the metal sheet are applied to the tool support-and-guide means 10, that is, forces due the weight of the reaction force transmitting means 24 which act through the connecting pin 44 and 56.

The tool support-and-guide means 10 is thus able to ensure the exact alignment in the aforementioned plane P under all conditions.

Preferably, a monitoring transducer is associated with the base part 14 of the tool support-and-guide means 10 and with a vertical slide 52, for detecting their mutual position along the working path P. This transducer may to advantage be of the optical-electronic type, including a vertical ruler 58 fixed to the base part 14 and a corresponding reader 60 fixed to the vertical slide 52.

This system enables the movements of the vertical slide 52, not with respect to the reaction force transmitting means 24 but with respect to the tool support-and-guide means 10, to be read. Thus, the reading is not influenced by deformation of the reaction force transmitting means.

The transducer 58, 60 may output a position signal intended to be applied to one of the inputs of a numerical control device (not shown) for controlling the rate of rotation of the motor 40 and hence the translational velocity of the vertical slide 52 so that this velocity varies in a predetermined program as the bending progresses.

To advantage, another system may be fitted to measure the movements between the second lower arm 38 and the column 30 of the reaction force transmitting means 24. This system preferably also consists of a transducer of the optical-electronic type with a ruler 62 fixed to the base part 30a of the column 30 and a corresponding reader 64 fixed to the slide 34.

As will be understood, from a comparison of the movements detected by the transducer 62, 64 with those detected by the transducer 58, 60, it is easily possible to work out the force exerted at each instant by the bending, starting from the moment at which the matrix die 54—interposed metal sheet—punch 50 system establishes contact, as indicated by the transducer 58, 60. In order to know this force, it is necessary simply to know a coefficient, that is, the overall elasticity of the reaction force transmitting structure 24, which, for these purposes, behaves as the spring of a dynamometer.

In practice, the transducer 62, 64 generates a position signal, and the numerical control device contains means for calculating a signal of the difference between the position signals output by the two transducers. The NC device also contains means for generating from the difference signal a signal proportional to the force exerted by the tools 50, 54 in the bending stroke, this also being intended to control the rate of rotation of the motor 40 and elevation of the vertical slide 52 according to a predetermined law, during the bending.

Figure 2:
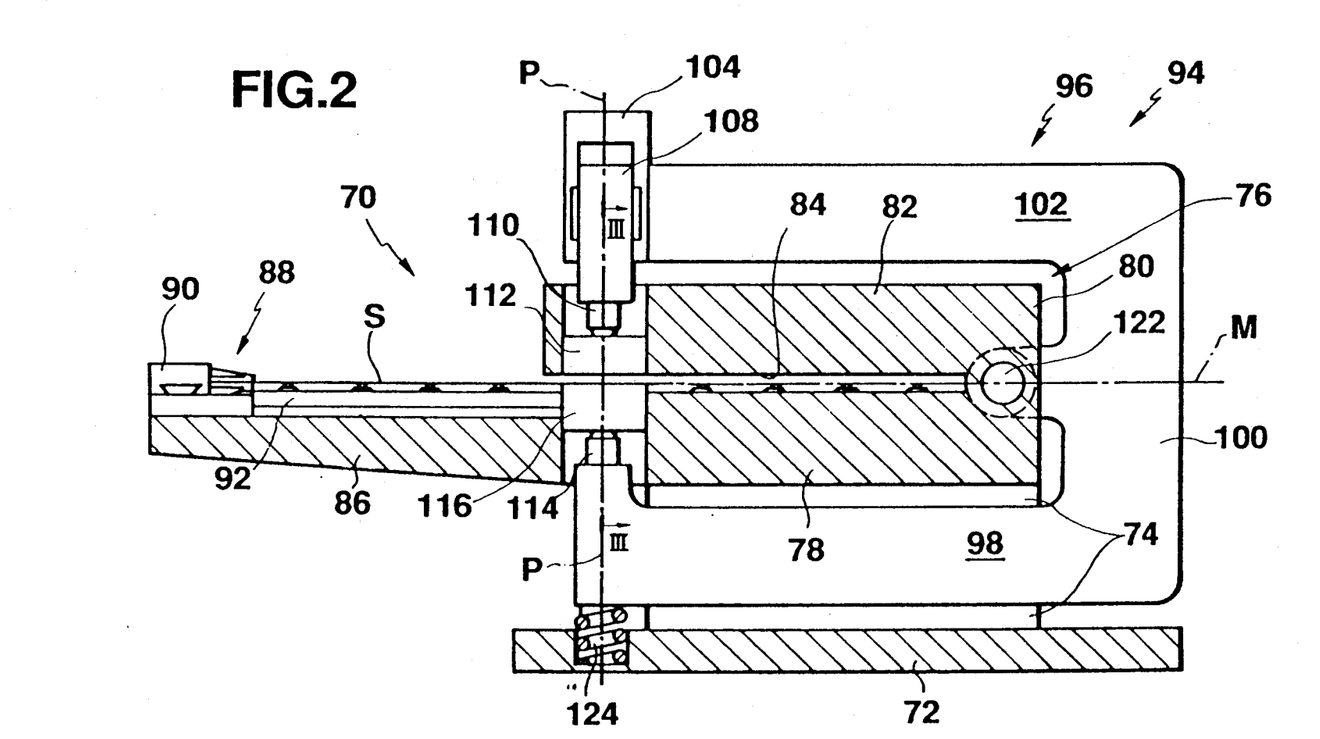
FIG. 2 is a partially-sectioned side elevational view of a horizontal punch according to the first feature of the invention.

FIG. 2 illustrates a horizontal punch formed in accordance with the first feature of the invention.

The punch comprises a frame, generally indicated 70, which, as in the press of FIG. 1, acts a tool support-and-guide means.

The tool support-and-guide means 70 is monolithic in the sense that all its parts are rigidly interconnected. It includes a base-plate 72 for fixing to the floor, from which rises a pillar 74. The upper end of the pillar 74 is rigidly fixed to a C-shaped element 76, termed the yoke element below, which includes a first lower arm 78, a crosspiece 80, and a first upper arm 82. The first upper arm and the first lower arms 82 and 78 are spaced vertically so as to define a slot 84 between them.

The lower arm 78 is extended by a cantilevered bracket member 86 whose free end carries one or more gripping clamps 88 for holding a corresponding edge of a metal sheet S. The grippers 88 are carried by a pair of crossed slides 90 movable under numerical control (not shown) along two horizontal axes, one in the plane of the drawing and the other perpendicular to this plane. This serves to position the metal sheet S in correspondence with its zones to be punched.

The first lower arm 78 of the tool support-and-guide means 70 and its bracket 86 carry a ball table 92 of known type, on which the metal sheet S rests. The ball table 92 extends into the slot 84.

The tool support-and-guide means 70 has an associated reaction force transmitting means, generally indicated 94. This means 94 includes two sections, one of which is constituted by a robust C-shaped element 96, termed the yoke element below, which embraces the gripper element of the tool support-and-guide means 70. The yoke element 96 includes the second lower arm 98, a crosspiece 100, and the second upper arm 102. The free end of the second upper arm 102 of the reaction force transmitting means 94 carries a means for generating the punching force which in this case is represented by a fluid cylinder 104 with a vertical axis (or by several fluid cylinders of this type).

A piston 108 of the fluid cylinder 104 is movable vertically in the cylinder 104 and, so to speak, constitutes the other section of the reaction force transmitting means 94.

The piston 108 is provided at its lower end with a rod 110 which is in thrust contact with an upper tool 112. Refering also to FIG. 3, the upper tool 112 is formed by at least one conventional unit including a punch 130 and respective sheet-pressing ring 131. The tool 112 is fixed to the upper arm 82 of a tool support-and-guide means 70 by means of a body 132 which guides the vertical sliding movement of the punch 130 and of the sheet-pressing ring 131 precisely along a straight, vertical working path, indicated P.

On the other hand, the free end of the second lower arm 98 of the reaction force transmitting means 96 in its turn includes a fixed rod 114 which is in thrust contact with the base of a lower tool 116 aligned with the upper tool 112 and cooperating therewith. As shown particularly in FIG. 3, the lower tool 116 is formed by at least one conventional unit which includes a die 133. The lower tool 116 is fixed to the first lower arm 78 of the tool support-and-guide means 70 by a block 134.

As shown in FIG. 2, the reaction force transmitting means 94 is connected in a floating and isostatic manner to the tool support-and-guide means 70 in correspondence with a median plane M between the first upper arm 82 and the first lower arm 78, and between the second upper arm 102 and the second lower arm 98. More particularly, the suspension is achieved by means of a robust transverse pin 122 which interconnects the two crosspieces 80 and 100 in a position remote from the working path p, so that the reaction force transmitting means 94 is pivotable about the pin 122 against the tool support-and-guide means 70.

In order to ensure that the lower rod 114 of the second lower arm 98 of the reaction force transmitting means 94 is in contact with the lower tool 116, a helical compression spring 124 is interposed between the free end of the second lower arm 98 of the reaction force transmitting means 94 and the base-plate 72 of the tool support-and-guide means 70 so that the spring 124 acts as a resilient support member.

As will be understood, the fundamental conditions of the invention are again respected in the case of the punch of FIG. 2. In fact, the reaction force transmitting means 94 is free to deform under the effect of the punching force without transferring deformations to the tool support-and-guide means. The line of application of the punching force coincides with the axis or path P of the punch unit which includes the upper tools 112 and the lower tool 116. Moreover, given the closeness of the lower tool 116 to the lower rod 114 of the reaction force transmitting means 94, the lower tool 116 and the lower rod 114 may be considered as rigidly connected.

As will be noted, the connecting pin 122 and the spring 124 support the weight of the reaction force transmitting means 94 completely, so that this weight does not affect the tool support-and-guide means 70.

By virtue of the essential symmetry of the yoke element of the reaction force transmitting means 94, it is possible to balance precisely the masses, or rather the moments of inertia, of this means above and below conneting pin 122. This configuration is advantageous if it is remembered that, because of the very high speed of the punch, which may exceed 500 strokes per minute in modern machines, the force applied during punching is essentially impulsive. Thus, if the two force masses constituted by the second lower arm 98 and the second upper arm 102 on opposite sides of the punch units have the same inertias, the punching force generated between the fluid cylinder 104 and the piston thereof 108 is transfered through the punching tool 112 and 116 to the lower lod 114 of the second lower arm 98.

The punching tools 112 and 116 act as a third billiard ball interposed between two balls of equal mass: the central ball, when it is hit by one of these, transfers the collision energy to the other ball and itself remains still due to the principle of action and reaction. Because of the above, it is also preferable for the elasticities of the second lower arm 98 and second upper arm 102 of the reaction force transmitting means 94 to be the same.

Hence, the reaction force transmitting means transfers only a small part of its dynamic energy to the tool support-and-guide means 70 which is practically free from vibrations generated in the punch.

Figure 4:
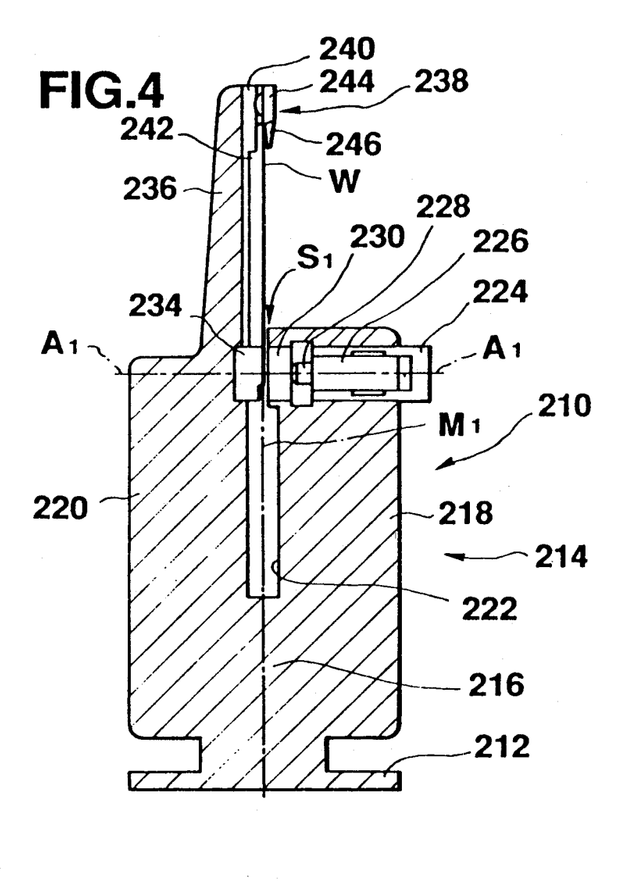
FIG. 4 is a partially-sectioned, schematic side elevational view of a punching machine according to the first embodiment of the second feature of the invention.

Now, with reference to FIG. 4, a punching machine according to the second feature of the present invention includes a strong frame, generally indicated 210. The frame 210 includes a base-plate 212 for fixing to the floor and a U-shaped yoke, generally indicated 214. The yoke 214 is constituted by a lower crosspiece 216 supported rigidly by base-plate 212, and by a pair of upwardly-directed arms 218 and 220 defining between them a working space $S_1$ which is extended at the bottom by a central slot 222.

Near its free end, the arm 218 carries a fluid cylinder 224 with a horizontal axis (or several fluid cylinders of this type). A piston 226 is movable horizontally in the cylinder 224. The piston 226 is provided with a rod 228 which in turn pushes a tool 230 constituted by at least one conventional unit including a punch and a respective blank-holder ring guided in their seat which is fixed relative to the arm 218.

Mechanical/electrical means of some suitable kind could be used instead of a fluid cylinder as the member for generating the punching force.

A die tool 234 mounted near the free end of the other arm 220 is aligned with the punch tool 230 and cooperates therewith. The die tool 234 is also constituted by at least one conventional unit which includes at least one punching die. In a practical solution, the tools 230, 234 may be replaced by a multiplicity of automatically and rapidly interchangeable tools, for example, mounted on rotary turrets.

As can be seen in FIG. 4, the two tools 230 and 234 are situated one on each side of the working space $S_1$ and the underlying slot 222, and cooperate along a horizontal axis $A_1$.

The arm 220 is extended upwardly by an upright 236 which carries a gripping and moving unit, the generally indicated 238 at its top.

In practice, the gripping and moving unit 238 includes a pair of slides, one of which, indicated 240, is movable vertically along guides 242 of the upright 236, whilst guide of the slide 240. The horizontal slide 244 carries one or more aligned clamps 246 which open downwardly. During the operation of the punching machine, the clamps 246 grip and hold the uper edge of a piece W of sheet metal to be punched. The piece W thus remains suspended with its plane coinciding with the outer plane, indicated M1, of the die 234, which is also the median plane of the underlying slot 222.

The movements of the two slides 240 and 244 take place under numerical control, so that each time the piece W of sheet metal is positioned according to its regions to be punched.

As will be understood, during these movements along the horizontal and vertical axes, the piece W remains in the median plane M1 and is not subject to any friction since it is suspended freely. The movements along the two axes from one position to another can thus take place much more rapidly than when each piece of sheet metal rests horizontally on a ball table. Moreover, by virtue of the absence of the balls, these movements are not hindered.

The second embodiment illustrated in FIG. 5 will now be described. In this drawing, the parts which are the same as or similar to those of FIG. 4 are indicated by the same reference numerals, and their description will not be repeated except to point out the differences with respect to FIG. 4.

Figure 5:
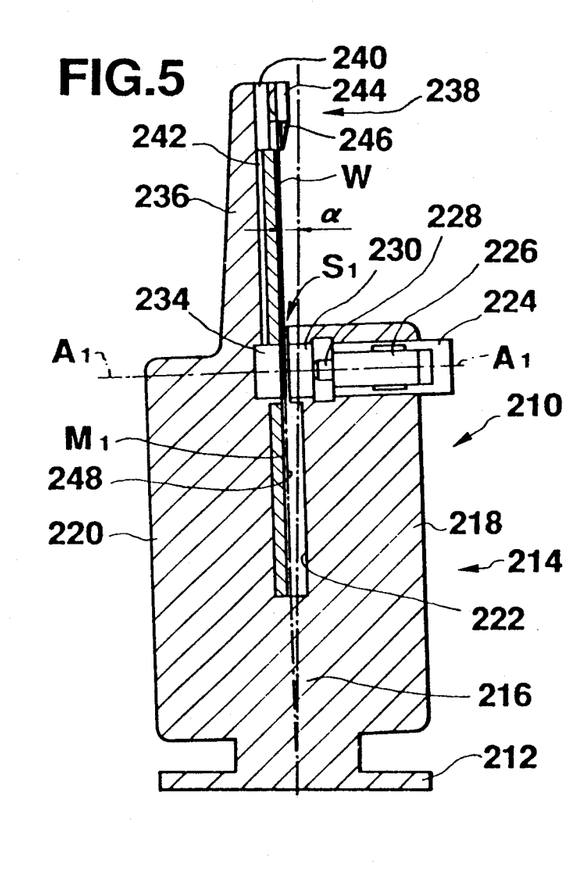
FIG. 5 is a partially-sectioned, schematic side elevational view of a punching machine according to another embodiment of the second feature of the invention.

The punching machine illustrated in FIG. 5 differs from that of FIG. 4 by the following two characteristics:

the U-shaped yoke 214 with all the devices connected thereto is inclined to the base-plate 212 by a small angle alpha, preferably between 1° and 10°, that is to say, the median plane $M_1$ of the machine is inclined to the vertical by alpha;

The punching space $S_1$ is defined on the side of the arm 220 by a smooth surface 248 for supporting the piece W, which coincides with the median plane $M_1$. This surface is defined by a plate fixed to the upright 236 and extending for a certain distance above the die tool 234. The same smooth surface 248 extends below the working space $S_1$ and the tool 234 and coincides with the median plane of the slot 222.

The jaw of the clamp or of each clamp 246 situated between the metal sheet W and the smooth support surface 248 is thin enough not to alter substantially the attitude of the supported piece W. As will be understood, the friction developed between the piece W and the surface 248 during the movements which serve to position the piece between the various punching operations is completely negligible, given that the component of its weight which bears on the surface 248 is completely negligible in view of the small angle alpha. Nevertheless, the piece W of sheet metal is still guided with precision by the surface 248 which also prevents it from vibrating as a result of the impulsive forces and movements characteristic of punching.

The plate which defines the support surface 248 above, the punching space $S_1$ may be provided with suitable grooves (not shown) for the passage of the slide or slides 240.

Figure 6:
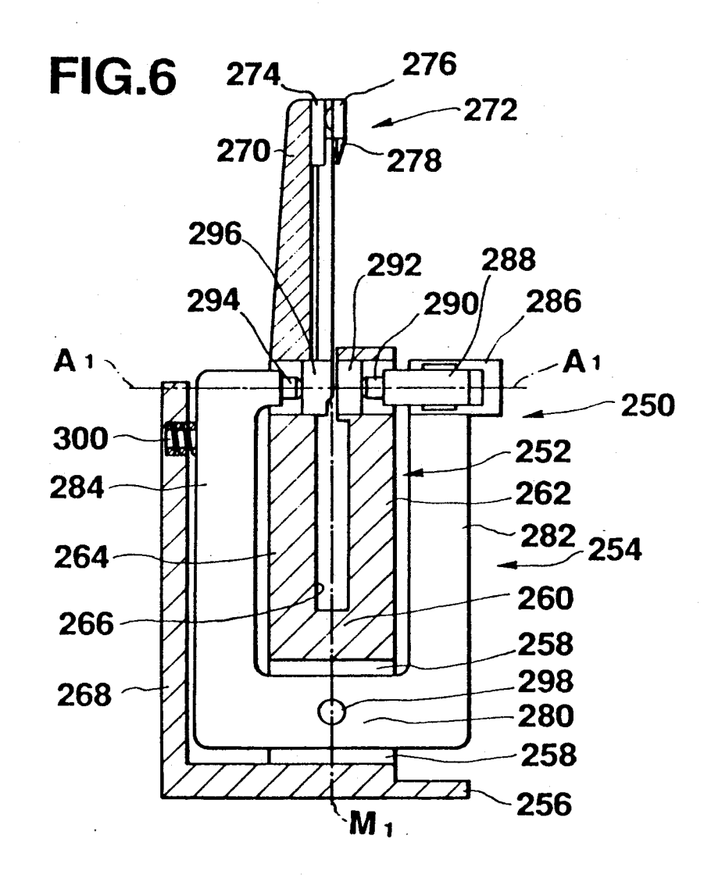
FIG. 6 is a partially-sectioned schematic elevational view of a punching machine according to a third embodiment of the second feature of the invention.

Reference will now be made to FIG. 6 to describe a third embodiment of the another feature of the invention.

The essential difference in FIG. 6 is that the frame 250 comprises a tool support-and-guide means 252 and a reaction force transmitting means 254, which are similar to those that have been explained above in detail in the descriptions for the first feature of the present invention.

The tool support-and-guide means 252 again includes a base-plate 256, a leg section 258, a crosspiece 260 and two upwardly-directed arms 262 and 264 with a central vertical slot 266 defining a median plane $M_1$.

Also, a lateral upright 268 projects upwardly from the base-plate 212.

An another lateral upright 270, similar to the upright 236 of FIG. 4, projects upwardly from the arm 264 and carries the gripping and moving unit 272 with its slides 274 and 276 and its clamp or claims 278.

The reaction force transmitting means 254 is also constituted by a yoke-like element with a crosspiece 280 and two upwardly-projecting arms 282, 284. As can be seen, the yoke-like element acting as the reaction force transmitting means 254 surrounds the yoke-like element acting as the tool support-and-guide means 252.

The top of the arm 282 of the reaction force transmitting means 254 carries a fluid cylinder 286 with its piston 288.

The piston 288 is provided with a rod 290 which is in thrusting contact with a punch tool 292.

The upper end of the other arm 284 of the reaction force transmitting means 254 in turn includes a fixed rod 294 which is situated in thrusting contact with the base of a die tool 296 which is aligned with the punch tool 292 and cooperates therewith. The detail structures of the punch tool 292 and die tool 296 is same as those illustrated in FIG. 3. Thus the explanation therefore will be omitted here.

The reaction force transmitting means 254 is supported by the tool support-and-guide means 252 for rocking, by means of a fulcrum constituted by a connecting pin 298 which interconnects the two crosspieces 260 and 280 in the median plane $M_1$.

A spring 300, interposed between the upper end of the arm 284 of the reaction force transmitting means 254 and the upright 268 of the tool support-and-guide means 252, serves to maintain the thrusting contact between the rod 294 and the die tool 296.

As already explained, in the embodiment of FIG. 6, the general structure of the punching machine is split into two separate structures, that is, a reaction force transmitting means whose sole function is to transmit the working force, and a tool support-and-guide means whose sole function is to support and guide the tool and rigorously to maintain the relative positions of the workpiece to be worked and the punching unit.

Moreover, by virtue of the substantial symmetry of the reaction force transmitting means 250, it is possible precisely to balance the masses, or rather the moments of inertia of this structure, on the two sides of the connecting pin 298. This configuration is advantageous, considering that, as a result of the very high punching speed, which in modern machines may exceed 500 punches per minute, the force applied in the punching operation is essentially impulsive. Therefore, if the two force masses constituted by the two arms 282 and 284 on opposite sides of the punching unit 290 and 296 have equal inertia, the punching force generated between the cylinder 286 and the piston 288 is transferred to the rod 290 of the arm 284 of the reaction force transmitting means 254 through the tools 292 and 296.

The punching tools 292 and 296 act like a third billiard ball interposed between two balls of equal mass: according to the principle of action and reaction, when it is hit by one of these, the central ball transfers the impact energy to the other ball and does not move itself. Since the above takes place, it is preferable that the two arms 282 and 284 of the reaction force transmitting means 254 also have equal resilience values.

The reaction force transmitting means therefore transfers only a small part of its dynamic energy to the tool support-and-guide means 252 which is practically free from the vibrations generatd during punching.

Figure 7:
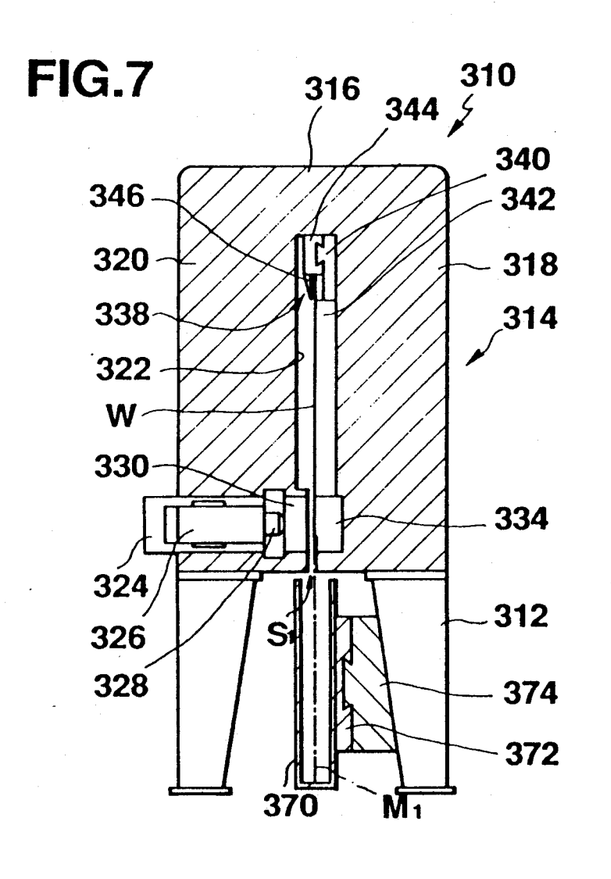
FIG. 7 is a partially-sectioned schematic elevational view of a punching machine according to a fourth embodiment of the second feature of the invention.

FIG. 7 is a partially-sectioned, schematic side elevational view of another variant of the second feature of the invention, a variant applicable to any one of the embodiments of FIGS. 4, 5 and 6 and shown here as a variant of the embodiment of FIG. 4.

There is a frame, generally indicated 310, which includes means 312 for supporting it on the floor, constituted by one or more elements which support a U-shaped yoke 314. The yoke 314 is constituted by an upper crosspiece 316 and by a pair of downwardly-directed arms 318 and 320 defining between them a working space $S_1$ which extends upwardly into a slot 322.

The functions of the fluid cylinder 324 and of the piston 326 with its rod 328, like the characteristics of the tools 330 and 334, are the same as those of the corresponding elements of FIG. 4.

The slot 322 is substantially wider than those 222, 266, of the preceding three embodiments since the gripping and moving unit 338, constituted mainly by a pair of slides, is located therein. One of the slides, indicated 340, is movable vertically along guides 342 situated at the sides of the arm 318, whilst the other, indicated 344, is movable horizontally on the guide of the slide 340.

The slide 344 carries one or more clamps 346 which open downwards so that the sheet metal W to be punched is suspended in the median plane coinciding with the outer plane of the die 334, indicated $M_1$.

The floor-support means 312 are sufficiently high to enable the metal sheet to be suspended not to come into contact with the floor when the slide 340 is at the lower end of its travel.

This "inverted" solution is of interest because it enables the punched piece to be discharged and allowed to fall freely so as considerably to reduce the pauses required for the replacement of the piece.

A receptacle 370 for receiving the piece W released by the clamp or clamps 346 is preferably situated under the punching space $S_1$. The receptacle 370 is carried by a slide 372 movable horizontally along a guide 374 in a direction perpendicular to the plane of the drawing. This enables the punched pieces W to be moved away from the punching machine.

Although the invention has been described in its preferred embodiments, it is to be understood that various changes and modifications may be made within the purview of the appended claims without departing from the true scope and spirit of the invention in its broader aspects.

Figure 3:
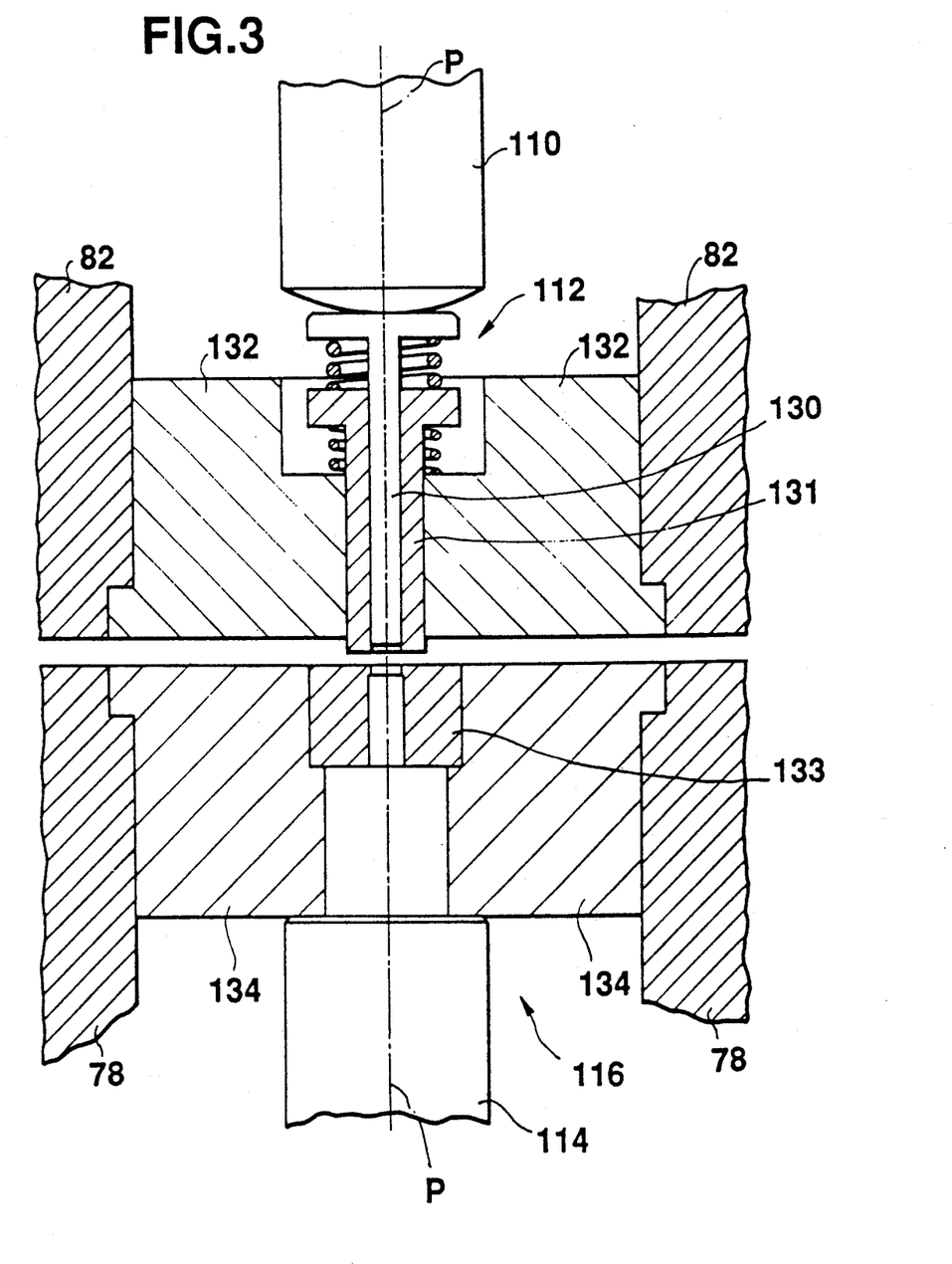
FIG. 3 is a schematic cross-section taken, on an enlarged scale, in the plane indicated III—III in FIG. 2.

For example, the characteristic of the smooth support surface of FIG. 2 could also be incorporated in the arrangements of FIGS. 1, 3 and 5.

What is claimed is:

1. A machine tool comprising:
   a pair of tools at least one of which is movable toward and away from the other to process a workpiece;
   a first frame structure to support the pair of tools, said frame structure having a guide portion to guide said at least one movable tool along a specified axis; and
   a second frame structure constructed separately from the first frame structure, said second frame structure including a pair of arms at least one of which is movable along the specified axis, means for pivotally connecting each arm to said first frame structure at positions located on the axis, and a drive mechanism to move the at least one movable arm toward and away from the other arm along the specified axis;
   said second frame structure transmitting the reaction force which is acted on the tools during processing operation, from one tool to the other.

2. A machine tool comprising:
   a pair of tools at least one of which is movable toward and away from the other to process a workpiece;
   a first frame structure to support the pair of tools, said frame structure having a guide portion to guide said at least one movable tool along a specified axis; and
   a second frame structure constructed separately from the first frame structure, said second frame structure including a pair of arms at least one of which is movable along the specified axis, means for pivotally connecting each arm to said first frame structure at positions located on the axis, and a drive mechanism to move the at least one movable arm toward and away from the other arm along the specified axis;
   said second frame structure transmitting the reaction force which is acted on the tools during processing operation, from one tool to the other;
   wherein the pair of tools comprises a punch and a die for bending operation,
   wherein either one of the punch and die is fixed to the first frame structure and the other one of the punch and die is vertically movably supported on the first frame structure,
   and wherein the second frame structure is connected to the first frame structure at a position located on the tool moving axis.

3. The machine tool of claim 2, wherein the second frame structure is connected to the first frame structure at a position located near a position where the fixed tool is provided.

4. The machine tool of claim 3, wherein the connecting means comprises connecting pin, and the fixed tool is fixed to the first frame structure by the connecting pin.

5. The machine tool of claim 3, wherein the first frame structure includes a leg section for supporting and guiding the movable tool so as to be movable in the vertical direction, and, a first upper arm provided on the leg section through a first lower arm and a cross piece, for supporting the fixed tool; and wherein the second frame structure includes a second upper arm, the tip thereof being connected to the first upper arm by the connecting pin, a vertical column which is supported by the second upper arm in a manner such that it is suspended from a base portion of the second upper arm, a second lower arm which is supported by the vertical column so as to be vertically movable, and a driving means for moving the second lower arm in the vertical direction; and wherein the tip of the second lower arm is connected to the movable tool.

6. The machine tool of claim 5, where the tip of the second lower arm is pivotably connected to the movable tool.

7. The machine tool of claim 6, further comprising a deformation detecting means for detecting deformation produced within the second frame structure, the deformation detecting means comprising a first detecting means for detecting movement of the second lower arm with respect to the vertical column, a second detecting means for detecting the movement of the movable tool with respect to the first frame structure, and means for comparing signals from the first detecting means and the second detecting means.

8. The machine tool of claim 7, further comprising numerical control means for controlling the driving speed of the driving means in response to a signal from the deformation detecting means.

9. The machine tool of claim 8, wherein the driving means comprises a ball screw for vertically moving the second lower arm and an electric motor for rotating the ball screw.

10. A machine tool comprising:
a pair of tools at least one of which is movable toward and away from the other to process a workpiece;
a first frame structure to support the pair of tools, said frame structure having a guide portion to guide said at least one movable tool along a specified axis; and
a second frame structure constructed separately from the first frame structure, said second frame structure including a pair of arms at least one of which is movable along the specified axis, means for pivotally connecting each arm to said first frame structure at positions located on the axis, and a drive mechanism to move the at least one movable arm toward and away from the other arm along the specified axis;
said second frame structure transmitting the reaction force which is acted on the tools during processing operation, from one tool to the other;
wherein the pair of tools comprise a fixed tool and a movable tool.

11. The machine tool of claim 10 wherein the second frame structure is suspended on the first frame structure so as to allow the second frame structure to freely pivot and vibrate.

12. The machine tool of claim 11 wherein the machine tool is adapted to be changed to a bending machine.

13. A machine tool comprising:
a pair of tools at least one of which is movable toward and away from the other to process a workpiece;
a first frame structure to support the pair of tools, said frame structure having a guide portion to guide said at least one movable tool along a specified axis; and
a second frame structure constructed separately from the first frame structure, said second frame structure including a pair of arms at least one of which is movable along the specified axis, means for pivotally connecting each arm to said first frame structure at positions located on the axis, and a drive mechanism to move the at least one movable arm toward and away from the other arm along the specified axis;
said second frame structure transmitting the reaction force which is acted on the tools during processing operation, from one tool to the other;
wherein said first and second frame structures are of C-shape.

* * * * *